Aug. 12, 1969          J. L. ADAMSON          3,460,728
WARNING EQUIPMENT MOUNT FOR EMERGENCY VEHICLES
Filed July 11, 1967
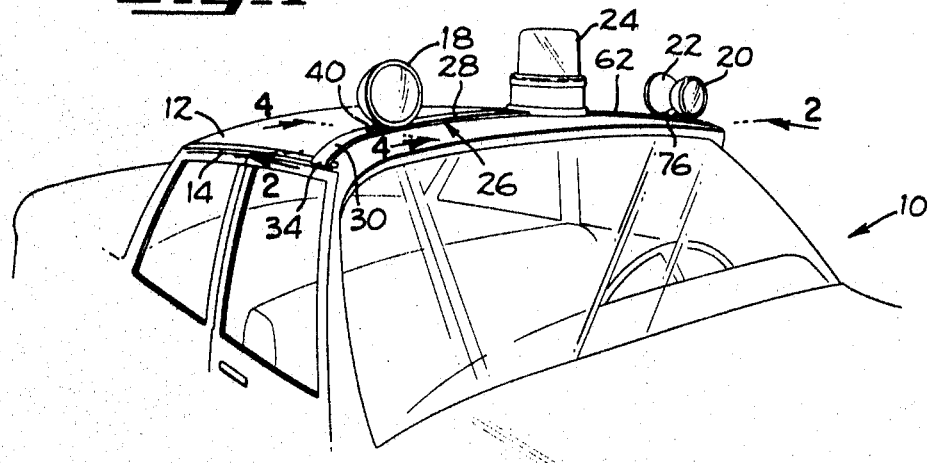
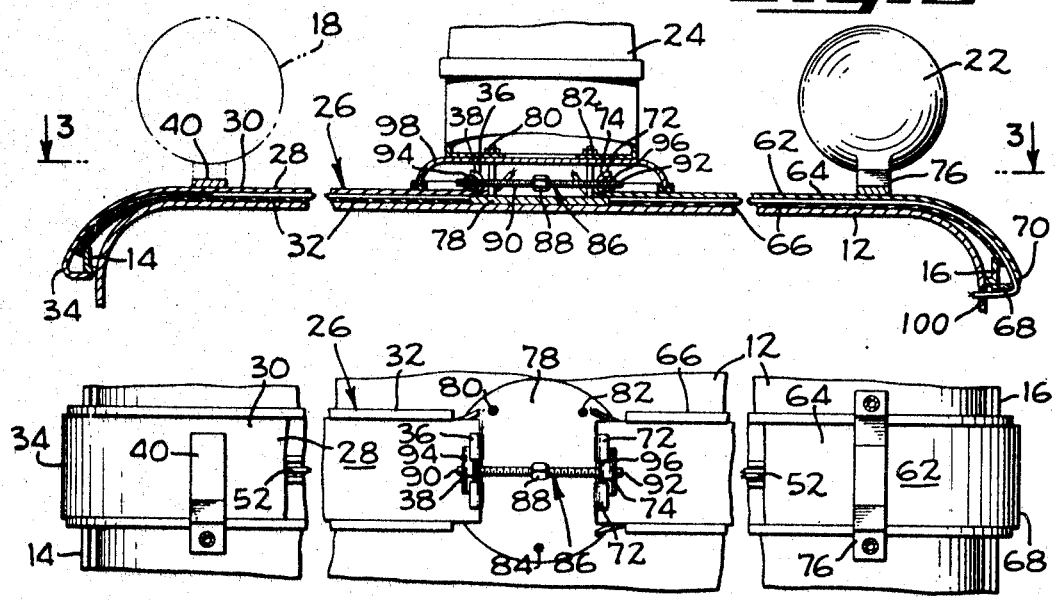
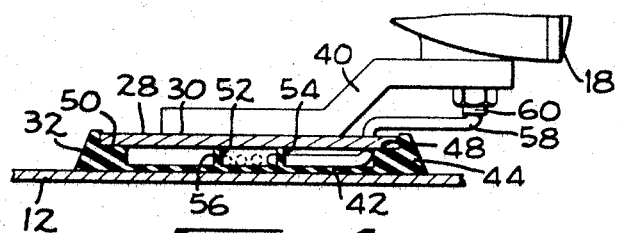
INVENTOR.
JAMES L. ADAMSON
BY Jack W. Edwards
ATTORNEY 0,728
Patented Aug. 12, 1969

3,460,728
WARNING EQUIPMENT MOUNT FOR EMERGENCY VEHICLES
James L. Adamson, Sunnyvale, Calif.
(210 San Jose Ave., Apt. 8, San Jose, Calif. 95125)
Filed July 11, 1967, Ser. No. 652,583
Int. Cl. B60r *7/00, 9/04, 11/00*
U.S. Cl. 224—42.1  2 Claims

ABSTRACT OF THE DISCLOSURE

A mount for quickly attaching warning equipment to the roof of an emergency vehicle, without drilling holes in the roof, is revealed herein and includes a pair of flexible straps adapted to opposite sides of the roof and conform to the profile thereof. The straps are connected together by an adjustable link which tensions the straps upon the roof, drawing the under surfaces thereof into contact with the top surface of the roof.

BACKGROUND OF THE INVENTION

Field of the invention

Art pertinent to this invention comes under the illumination classification and more particularly pertains to quick attachable light supports for vehicles.

Description of the prior art

Various types of mounts are known for holding warning equipment on the roof of an emergency vehicle. The standard practice is to drill holes in the roof for bolts and wiring required and to mount the equipment directly thereon. This type of installation requires considerable time and the resulting holes in the roof depreciate the resale value of the vehicle. Quick mounting racks have been used to hold the warning equipment on a rigid frame above the vehicle roof. However, these racks tend to act as an airfoil and create considerable vibration and noise when the vehicle is traveling at a rapid rate of speed. Furthermore, such racks are subjected to high wind stresses and lack the stability of direct roof mounting. Another problem with known mounting racks is that the wiring and adjusting bolts are exposed and create a tempting target for practical jokers and vandals.

SUMMARY OF THE INVENTION

This mount enables warning equipment to be quickly attached to the roof of an emergency vehicle without drilling holes in the roof. The mount conforms with and contacts the roof profile so that no vibrations are set up by air currents passing therebetween. Wiring and adjusting bolts are concealed within the mount and stability is provided by anchorage to roof gutters and direct bearing on the roof. The mount includes a pair of straps that anchor to gutters on opposite sides of the vehicle roof and adjustable linking means join the straps together in tension so that the under surface of each strap contacts the top surface of the roof. An interior channel is provided within the straps for housing wiring and the adjustable linking means are concealed beneath a cover plate.

DESCRIPTION OF THE DRAWING

FIGURE 1 is a perspective view of an emergency vehicle having warning lights fastened thereon by a mount embodying the present invention.

FIGURE 2 is a section of the mount taken on line 2—2 of FIG. 1.

FIGURE 3 is a section taken on the line 3—3 of FIG. 2.

FIGURE 4 is a partial section taken on the line 4—4 of FIG. 1.

DESCRIPTION OF THE PREFERRED EMBODIMENT

Looking now at FIG. 1, an emergency vehicle 10 is shown having a roof 12 with a right gutter 14 and a left gutter 16 (see FIG. 2). Warning equipment such as red lights 18 and 20 which face forward of the vehicle, amber light 22 facing rearward of the vehicle, and revolving dome light 24 centered thereon are secured to the roof by a mount 26 which interlocks with the gutters. Such warning equipment illustrates the function of the mount and it will be understood that various combinations and arrangements of lights can be used to satisfy particular requirements. The mount can also be used for sirens, radio antennas, loud speakers and radar units.

Mount 26 includes a right strap 28, shown in FIG. 2, which is formed by a metal band 30 and a rubber cushion 32. The metal band has a hook 34 at one end adapted to fit about and anchor upon the right gutter 14. A grip 36 is provided at the opposite end of the band and curves upward in the reverse direction from the hook. The grip has a center slot 38, as shown in FIG. 3, to receive linking means which will later be described. A bracket 40 is fixed to the top surface of the band and red light 18 is bolted to a portion thereof spaced above the band. The rubber cushion fits about the edges and under portion of the band, as shown in section in FIG. 4. This cushion includes a base portion 42 which is adapted to rest upon the roof 12. A front support 44 and a rear support 46 projects upward from the base to hold the band in spaced relationship thereabove. Seat 48 is provided within the front support to hold the leading edge of the band while the trailing edge rests upon seat 50 of the rear support. The cushion and band are held together by an adhesive applied to the seats. An interior wiring channel 52 is defined between the cushion base and metal band by a first wall 54 and a second wall 56 projecting up from the base. Within this channel, lead wires extend to points of take off for the various lights. Wire 58 is shown passing from the channel through the first wall to the front support, then upward through the band and outward to a hollow stem 60 of red light 18.

Mount 26 also has a left strap 62, as shown in FIG. 2, formed by metal band 64 and rubber cushion 66. The metal band has a hook 68 at one end adapted to fit about left gutter 16 and a hole 70 is provided within the hook for extending wiring from the mount to the inside of the vehicle. At the opposite end of the metal band is a grip 72 curving upward in a reverse manner from the hook and a center slot 74 (FIG. 3) is provided within the grip. A double bracket 76 is fixed to the top surface of the metal band and has portions spaced above the band which extend forward and rearward therefrom for mounting red light 20 and amber light 22, respectively. Cushion 66 is a rubber extrusion having a cross section similar to that previously described for cushion 32, so it will be understood that this cushion fits about the edges and under portion of the metal band in the same manner as shown in FIG. 4.

A center plate 78 is shown in FIG. 3 resting upon the top surface of the roof 12 and this plate has stud bolts 80, 82 and 84 projecting upward therefrom. Grip 36 of right strap 28 and grip 72 of left strap 62 overlap upon the center plate. These grips are linked together by a bolt 86 having a turning head 88 centered between stud portions 90 and 92 which are threaded in opposite directions. This bolt fits within the center slots 38 and 74 of the grips and a toggle nut 94, which is a cylindrical rod transversely drilled with internal threads, fits upon stud portion 90 behind grip 36. A similar toggle nut 96 fits upon stud portion 92 behind grip 72 and thus, the grips are linked together by the bolt so that rotation in one direction causes the toggle nuts to move inward towards the turning head tightening the straps. A circular disk-shaped cover 98 (FIG. 2) fits about stud bolts 80, 82 and 84 enclosing bolt 86 between the cover and center plate. Revolving dome light 24 is then mounted upon the cover and anchored in place by the stud bolts.

Installation of mount 26 begins by attaching red lights 18 and 20 to brackets 40 and 76, respectively. Amber light 22 is mounted on bracket 76 and wires for these lights are connected with wiring extending through wiring channel 52 of cushions 32 and 66. Straps 28 and 62 are then positioned on the roof 12 and a small hole 100 (FIG. 2) is drilled through the door lintel at a point aligned with the center of the straps beneath left gutter 16. The mount wiring is then extended through this hole and connected with wiring on the inside of the vehicle. Center plate 78 is then positioned on the roof beneath the grips 36 and 72. Bolt 86 is fitted through slots 38 and 74 in the grips and toggle nuts 94 and 96 are positioned behind the grips. The bolt is turned by turning head 88 so that the toggle nuts move inward on the bolt and draw the grips together. Thus, the straps are tensioned between roof gutters 14 and 16 which are engaged by hooks 34 and 70, respectively. Metal bands 30 and 64 are flexible longitudinally and conform with the roof profile, forcing the cushions into sealing contact with the roof. Cover 98 is placed over stud bolts 80, 82 and 84, while wiring for the revolving dome light 24 is drawn through the cover. The dome light is connected with the wiring and mounted in position on top of the cover, where it is held in place by the stud bolts.

The arrangement of mount 26 provides for structural stability with the hook ends anchored to the roof gutters and tensioned so that the mount bears directly on the roof 12. While the metal bands 30 and 64 are flexible longitudinally, a high degree of stiffness is provided transversely since the width of the band is of a much smaller dimension than the length. This stiffness resists lateral bending of the metal bands due to wind stresses on the lights. Cushion 32 and 66 prevent scratching of the roof surface and provide an internal channel for wiring connections leading to the lights.

It will be understood that modifications and variations of the embodiments of the warning equipment mount for emergency vehicles disclosed herein may be resorted to without departing from the spirit of the invention.

Having thus described my invention, what I claim as new and desire to protect by Letters Patent is:

1. A mount for attaching warning equipment to the roof of an emergency vehicle comprising a center plate adapted to rest upon the top surface of the vehicle roof, a plurality of anchor bolts projecting upward from said center plate, a pair of flexible straps, each strap having a hook at one end to engage a roof gutter and a grip at the opposite end overlapping the center plate, adjustable means linking the grips of said pair of straps together for tensioning the straps between opposite sides of the vehicle roof and drawing the under surface of each strap into contact with the top surface of the vehicle roof, said adjustable linking means holding the center plate in position on the roof, and a cover plate fitting upon said anchor bolts over the strap grips and adjustable linking means as to enclose the adjustable linking means between the center plate and cover plate.

2. A mount as described in claim 1, wherein each of said straps include a metal band having a hook at one end to engage a roof gutter and a grip at the opposite end to engage said linking means, and a cushion fixed to the under surface of the band defining an internal channel therebetween for extending wires to said warning equipment.

References Cited
UNITED STATES PATENTS

| | | | |
|---|---|---|---|
| 2,783,367 | 2/1957 | Locke | 240—52.1 |
| 2,996,607 | 8/1961 | Witt | 240—7.1 |
| 3,087,051 | 4/1963 | Black | 240—7.1 |
| 3,281,030 | 10/1966 | Gosswiller | 224—42.1 |

FOREIGN PATENTS

| | | |
|---|---|---|
| 219,471 | 5/1957 | Australia. |
| 641,395 | 5/1962 | Canada. |

ROY D. FRAZIER, Primary Examiner

J. F. FOSS, Assistant Examiner

U.S. Cl. X.R.

240—7; 248—205, 237

UNITED STATES PATENT OFFICE
CERTIFICATE OF CORRECTION

Patent No. 3,460,728 August 12, 1969

James L. Adamson

It is certified that error appears in the above identified patent and that said Letters Patent are hereby corrected as shown below:

Column 1, line 15, after "adapted" insert -- to anchor --

Signed and sealed this 21st day of April 1970.

(SEAL)
Attest:

Edward M. Fletcher, Jr.
Attesting Officer

WILLIAM E. SCHUYLER, JR
Commissioner of Patents